UNITED STATES PATENT OFFICE.

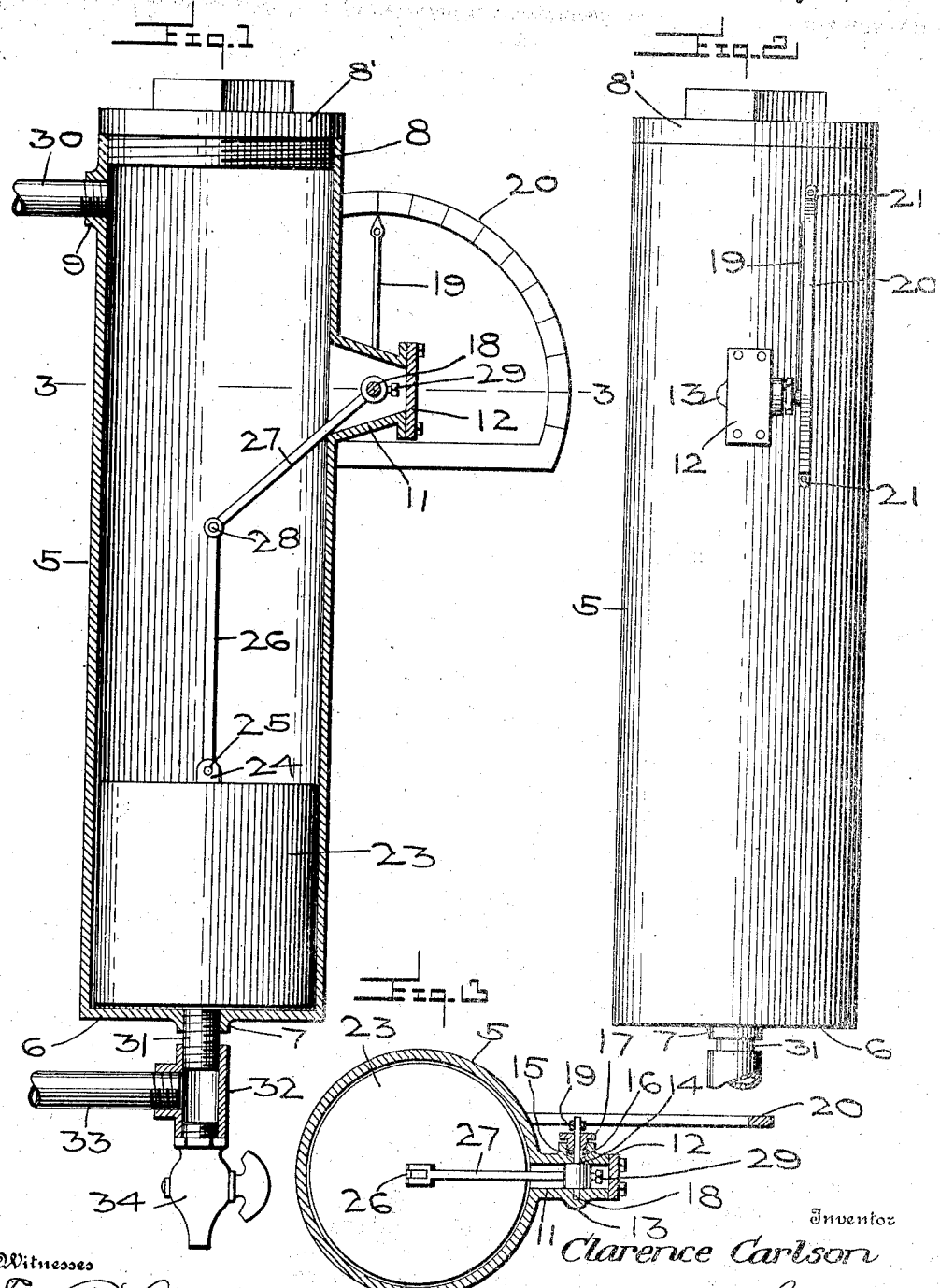

CLARENCE CARLSON, OF KENNEDY, MINNESOTA.

WATER-GAGE.

No. 928,304.　Specification of Letters Patent.　Patented July 20, 1909.

Application filed March 18, 1909. Serial No. 484,148.

*To all whom it may concern:*

Be it known that I, CLARENCE CARLSON, a citizen of the United States, residing at Kennedy, in the county of Kittson and State of Minnesota, have invented certain new and useful Improvements in Water-Gages, of which the following is a specification.

This invention relates to water gages.

The object of my invention is to provide an indicator for steam and other boilers, constructed so as to indicate the height or level of the water within a boiler.

A further object of my invention is to provide an indicator adapted to mechanically register the height of a liquid within a receptacle, so that the same may be distinctly seen from a distance.

A still further object of my invention is to provide a gage, constructed so that the registering of the same may be seen from two sides.

With these and other objects in view, the present invention consists in the combination and arrangement of parts as will be hereinafter more fully described and particularly pointed out in the appended claim, it being understood that changes in the specific structure shown and described may be made within the scope of the claim without departing from the spirit of the invention.

In the drawings forming a portion of this specification, and in which like numerals of reference indicate similar parts in the several views, Figure 1 shows a vertical sectional view of a gage embodying my invention, Fig. 2 is an elevation, Fig. 3 is a view on the line 3—3 of Fig. 1.

In the running of a steam engine, it is quite necessary in order to get the best results, that the water level within the boiler be kept as near as possible up to a predetermined point. The indicators usually employed for disclosing the height of the water within a boiler, are made of glass. The objection to this class of indicators is, that owing to the constant changes of temperature to which these glasses are subjected, they frequently break, causing the escape of steam and water. Then, owing to the inorganic matter held in suspension within the water, and which is partly precipitated in the boiling of the water, and which clings to the tube, the glass finally becomes so heated, as to become opaque, and no longer of service as an indicator. In my present invention, I overcome this objectionable feature, in that I construct a cylinder 5, preferably made of non-corroding metal, having the bottom 6, provided with the threaded boss 7. The upper end of the cylinder is interiorly threaded, as shown at 8, and held within this threaded end, is the screw top 8'. Near the upper end the cylinder is further provided with the threaded boss 9. Near the upper end, and at a point below and opposite the threaded boss 9, I provide the housing with the laterally extending bearing box 11, which is closed by means of the vertically held plate 12, secured by means of suitable screws. Upon one side, this box has the bearing lug 13, and registering therewith, is the bearing aperture 14 extending through the packing gland 15, holding the packing ring 16, the gland being threaded to receive the nut 17. Revolubly held within these bearing apertures, is the rock shaft 18, carrying the indicator 19 as clearly disclosed in Fig. 3. Held to this tubular float housing, and adjacent to the bearing box upon the side having the gland 15, is the bifacial, arcuate graduated member 20 provided with the perforated securing ends 21 by means of which this calibrated member is secured. The graduations which are marked upon both sides of this bifacial scale 20, represent an indicia of quantity or volume, to disclose the amount of water within the boiler.

Loosely held within the housing, is the cylindrical float 23, the upper face of which is provided with the securing ears 24, and loosely carried upon the pin 25, held by these ears, is the link 26, and this link at its upper end is secured within the forked end of the arm 27 by means of the pin 28. The arm 27, is secured to the rock shaft 18, by means of the set screw 29, which is accessible through the opening within the bearing box, when the plate 12 is removed. The pipe 30 projects from the upper boss 9, into the boiler, while from the lower boss 7, extends the nipple 31 holding the tee 32, from which extends the connecting pipe 33, the blow-off cock 34 extending from the lower end of the tee as disclosed. The gage is adjusted, in that after a suitable amount of water has been introduced into the boiler to raise the float, the indicator 19 will properly indicate the quantity of water within the boiler. As the water rises and falls within the boiler, the float responds to the change in elevation, and this change by means of the link 26 and the arm 27 is shown upon the bifacial scale arc 20.

The bottom of the float housing may be kept clear and free of sediment by means of the blow-off cock 34. The float is removed and inserted in uncapping the housing.

The parts are all simple of construction, positive of operation and are readily accessible.

Having thus described my said invention what I claim as new and desire to secure by United States Letters Patent is:

The herein described gage, comprising the combination with a tubular housing having a laterally extending bearing box, and an upper and lower threaded boss, of a float reciprocating within said housing, a rock shaft within said bearing box projecting beyond said box, an arm secured to said shaft, a link connecting said arm to said float, an indicator carried upon the projecting end of said shaft, and a bifacial scale held proximal to said indicator.

In testimony whereof I affix my signature, in presence of two witnesses.

CLARENCE CARLSON.

Witnesses:
LAURITZ MELGAARD,
HOGAN SMITH.